(12) United States Patent
Van Berkel (10) Patent No.: US 9,064,680 B2
(45) Date of Patent: Jun. 23, 2015

(54) AFM FLUID DELIVERY/LIQUID EXTRACTION SURFACE SAMPLING/ELECTROSTATIC SPRAY CANTILEVER PROBE

(71) Applicant: UT-Battelle, LLC, Oak Ridge, TN (US)

(72) Inventor: Gary J. Van Berkel, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 14/265,912

(22) Filed: Apr. 30, 2014

(65) Prior Publication Data

US 2014/0326872 A1 Nov. 6, 2014

Related U.S. Application Data

(60) Provisional application No. 61/818,024, filed on May 1, 2013.

(51) Int. Cl.
| | |
|---|---|
| *H01J 49/04* | (2006.01) |
| *G01Q 30/14* | (2010.01) |
| *G01Q 70/08* | (2010.01) |
| *H01J 49/16* | (2006.01) |
| *H01J 49/00* | (2006.01) |
| *H01J 49/26* | (2006.01) |

(52) U.S. Cl.
CPC .............. *H01J 49/167* (2013.01); *G01Q 30/14* (2013.01); *G01Q 70/08* (2013.01); *H01J 49/0031* (2013.01); *H01J 49/26* (2013.01); *H01J 49/0459* (2013.01)

(58) Field of Classification Search
CPC .................... G01N 2001/4061; H01J 49/0404; H01J 49/165; H01J 49/167; G01Q 30/00; G01Q 70/00; B05B 5/00
See application file for complete search history.

(56) References Cited

U.S. PATENT DOCUMENTS

| | | | | |
|---|---|---|---|---|
| 6,803,566 | B2 * | 10/2004 | Van Berkel | 250/288 |
| 7,250,139 | B2 * | 7/2007 | Espinosa et al. | 422/503 |
| 8,097,845 | B2 * | 1/2012 | Roach et al. | 250/288 |
| 8,207,496 | B2 | 6/2012 | Makarov et al. | |
| 8,294,119 | B2 | 10/2012 | Arscott et al. | |
| 2007/0114385 | A1 * | 5/2007 | Sarrut | 250/288 |
| 2007/0252083 | A1 | 11/2007 | Arscott et al. | |

(Continued)

OTHER PUBLICATIONS

Arscott et al., "A micro-nib nanoelectrospray source for mass spectrometry", Sensors and Actuators B (2004) 98: 140-147.

(Continued)

*Primary Examiner* — Jack Berman
*Assistant Examiner* — Eliza Osenbaugh-Stewar
(74) *Attorney, Agent, or Firm* — Novak Druce Connolly Bove + Quigg LLP (57) ABSTRACT

An electrospray system comprises a liquid extraction surface sampling probe. The probe comprises a probe body having a liquid inlet and a liquid outlet, and having a liquid extraction tip. A solvent delivery conduit is provided for receiving solvent liquid from the liquid inlet and delivering the solvent liquid to the liquid extraction tip. An open liquid extraction channel extends across an exterior surface of the probe body from the liquid extraction tip to the liquid outlet. An electrospray emitter tip is in liquid communication with the liquid outlet of the liquid extraction surface sampling probe. A system for analyzing samples, a liquid junction surface sampling system, and a method of analyzing samples are also disclosed.

28 Claims, 11 Drawing Sheets

(56) References Cited

U.S. PATENT DOCUMENTS

| | | | |
|---|---|---|---|
| 2008/0156985 A1* | 7/2008 | Venter et al. | 250/288 |
| 2011/0112503 A1 | 5/2011 | Ismagilov et al. | |
| 2011/0124027 A1* | 5/2011 | Gabi et al. | 435/29 |
| 2012/0285017 A1 | 11/2012 | Delamarche et al. | |
| 2013/0341279 A1* | 12/2013 | Otsuka et al. | 210/663 |

OTHER PUBLICATIONS

Arscott et al., "A nanofluidic emitter tip obtained by focused ion beam nanofabrication", Nanotechnology (2005) 16: 2295-2302.

Asano et al., "Self-aspirating atmospheric pressure chemical ionization source for direct sampling of analytes on surfaces and in liquid solutions", RCM (2005) 19(16): 2305-2312.

Brinkmann et al., "Microfluidic design rules for capillary slot-based electrospray sources", Appl Phys Lett (2004) 85: 2140.

Kaigala et al., "Microfluidics in the 'open space' for performing localized chemistry on biological interfaces", Angew Chem Int Ed Engl. (2012) 51(45): 11224-11240.

Laskin et al., "Tissue Imaging Using Nanospray Desorption Electrospray Ionization Mass Spectrometry", Anal. Chem. (2012) 84: 141-148.

Otsuka et al., "Scanning probe electrospray ionization for ambient mass spectrometry", Rapid Commun. Mass Spectrom. (2012) 26: 2725-2732.

Roach et al., "Nanospray desorption electrospray ionization: An ambient method for liquid-extraction surface sampling in mass spectrometry", Analyst (2010) 135: 2233-2236.

Van Berkel et al., "Thin-layer chromatography and electrospray mass spectrometry coupled using a surface sampling probe", Anal. Chem. (2002) 74: 6216-6223.

* cited by examiner

FIG. 12B

AFM FLUID DELIVERY/LIQUID EXTRACTION SURFACE SAMPLING/ELECTROSTATIC SPRAY CANTILEVER PROBE

CROSS REFERENCE TO RELATED APPLICATIONS

This application is claims priority to U.S. Provisional Patent Application No. 61/818,024, filed May 1, 2013, titled "AFM FLUID DELIVERY/LIQUID EXTRACTION SURFACE SAMPLING/ELECTROSTATIC SPRAY CANTILEVER PROBE," the entire contents of which are incorporated herein by reference.

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to a surface sampling and more particularly to liquid extraction surface sampling probes.

BACKGROUND OF THE INVENTION

The direct liquid extraction-based surface sampling approaches, which are applicable to the analysis of soluble components at a surface, provide several advantages over other surface sampling approaches. These advantages include the ability to on-line process the extracted sample post sampling and prior to analysis. While some problems like the analysis of certain absorbent surfaces impede this approach, the most significant limitation is the achievable sampling spatial resolution. The achievable spatial resolution is connected to the geometric configuration of the sampling probe as this configuration, along with solvent, and surface properties define the area of the liquid junction formed between the probe and the surface. As currently understood, this liquid junction size determines the effective sampling spatial resolution of one embodiment of a surface sampling probe which utilizes coaxial capillaries. This design provides extremely good liquid junction control and perturbations in the positioning of the inner and outer capillaries during sampling allow for sample trapping, reaction, and injection. However, robustness considerations limit the ultimate spatial resolution of this geometry because if the inner diameter of the inner capillary is too small, then the capillary easily plugs the extract flow path. The best spatial resolution using a continuous flow, dual capillary, liquid-extraction based probe claimed 12 µm resolution using solvent delivery and spray capillaries of at least 70 µm in outer diameter. To achieve a spatial resolution better than 1 µm will most likely require that the size of the inner diameter of the spray capillary be made smaller. However, a capillary smaller than 50 µm will likely result in plugging problem which will ultimately limit the resolution that can be achieved.

SUMMARY OF THE INVENTION

An electrospray system comprises a liquid extraction surface sampling probe. The probe comprises a probe body having a liquid inlet and a liquid outlet, and having a liquid extraction tip. A solvent delivery conduit is provided for receiving solvent liquid from the liquid inlet and delivering the solvent liquid to the liquid extraction tip. An open liquid extraction channel extends across an exterior surface of the probe body from the liquid extraction tip to the liquid outlet. An electrospray emitter tip is in liquid communication with the liquid outlet of the liquid extraction surface sampling probe.

The liquid extraction channel can be an open slotted channel extending across an exterior surface of the probe body from the liquid extraction tip to the liquid outlet. The aspect ratio of the liquid extraction channel can be greater than one.

The solvent delivery conduit can be a slotted channel extending across an exterior surface of the probe body from the liquid inlet to the liquid extraction tip. The aspect ratio of the slotted channel can be greater than one.

The electrospray emitter tip can be affixed to the probe body. The electrospray emitter tip can be integral with the probe body. The electrospray emitter tip can be provided on an electrospray nib. The electrospray nib can have a liquid nib channel for receiving extraction liquid from the liquid extraction channel and the liquid outlet, and delivering the extraction liquid to the electrospray emitter tip.

The electrospray nib can comprise a protrusion from the probe body. The protrusion can be shaped to provide the electrospray emitter tip. The electrospray nib can have a nib channel extending from the liquid outlet to the electrospray emitter tip. The nib channel can be an open slot. The nib channel can have an aspect ratio greater than one.

The solvent delivery conduit can be enclosed and pass through the probe body. The solvent delivery conduit can be an annular, inverted conical chamber within the probe body. The inverted conical chamber communicates with the liquid extraction tip at an apex end of the cone, and with the liquid inlet at the base end of the cone.

The probe can be configured as part of an atomic force microscope cantilever.

The surface of the liquid extraction channel can have a contact angle that is less than the contact angle of probe body surfaces adjacent to the liquid extraction channel. The contact angle can be less than 90°.

A system for analyzing samples can include a liquid extraction surface sampling probe. The liquid extraction probe can comprise a probe body having a liquid inlet and a liquid outlet, and having a liquid extraction tip, a solvent delivery conduit for receiving solvent liquid from the liquid inlet and delivering the solvent liquid to the liquid extraction tip, and an open liquid extraction channel extending across an exterior surface of the probe body from the liquid extraction tip to the liquid outlet. An electrospray emitter tip is in liquid communication with the liquid outlet of the liquid extraction surface sampling probe. An analysis device is provided for receiving the electrospray and analyzing the sample. The analysis device can be a mass spectrometer, an ion mobility spectrometer, and a differential mobility analyzer, among others.

The probe can be configured as part of an atomic force microscope cantilever. The cantilever is connected to an atomic force microscope such that the probe can also be used as an atomic force microscope tip.

A liquid junction surface sampling system can include a liquid extraction surface sampling probe. The liquid extraction surface sampling probe has a probe body having a liquid inlet and a liquid outlet, and a liquid extraction tip, a solvent delivery conduit for receiving solvent liquid from the liquid inlet and delivering the solvent liquid to the liquid extraction tip, and an open liquid extraction channel extending across an exterior surface of the probe body from the liquid extraction tip to the liquid outlet. The probe is configured as part of an atomic force microscope cantilever, and the cantilever is connected to an atomic force microscope.

The probe can further comprise an electrospray emitter tip in liquid communication with the liquid outlet of the liquid extraction surface sampling probe. The system can further comprise an analysis device for receiving the electrospray and analyzing the sample. The analysis device can be a mass spectrometer.

A method of analyzing samples includes the step of providing a liquid extraction surface sampling probe, comprising a probe body having a liquid inlet and a liquid outlet, and having a liquid extraction tip, a solvent delivery conduit for receiving solvent liquid from the liquid inlet and delivering the solvent liquid to the liquid extraction tip, and an open liquid extraction channel extending across an exterior surface of the probe body from the liquid extraction tip to the liquid outlet; and an electrospray emitter tip in liquid communication with the liquid outlet of the liquid extraction surface sampling probe. Solvent liquid is applied to a sample surface through the solvent delivery conduit and the liquid extraction tip of the liquid extraction surface sampling probe. Sample-containing solvent is removed through the liquid extraction channel. The sample-containing solvent is directed through the electrospray tip, the electrospray tip forming an electrospray from the sample-containing solvent. The electrospray is directed to an analysis device. The method can further comprise the step of using the liquid extraction surface sampling probe as an atomic force microscope tip, and taking atomic force microscope readings with the tip.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
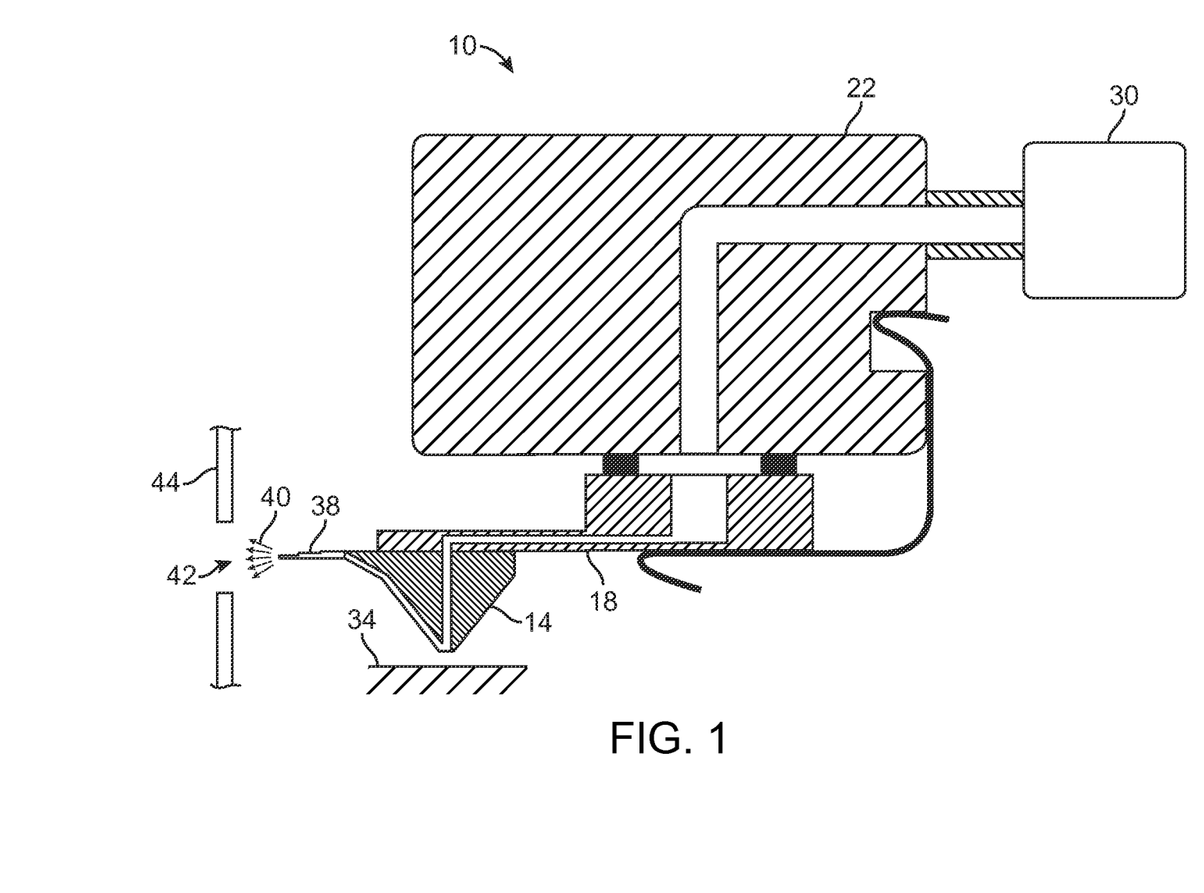
FIG. 1 is a schematic diagram of a liquid extraction surface sampling probe as configured with an atomic force microscope.

There is shown in FIG. 1 an analysis system 10 according to the invention. The analysis system 10 includes a liquid extraction surface sampling probe 14. In one embodiment, the liquid extraction surface sampling probe 14 is mounted to a cantilever 18 of an atomic force microscope 22. The liquid extraction surface sampling probe 14 receives solvent from a source 30 and directs the solvent to a sample surface 34. The probe 14 can further comprise an electrospray emitter tip 38 which forms an electrospray 40 and directs the electrospray to a suitable analysis device such as inlet 42 of a counter-electrode 44 which can be the inlet to an analysis device such as a mass spectrometer or ion mobility spectrometer.

Figure 2A:
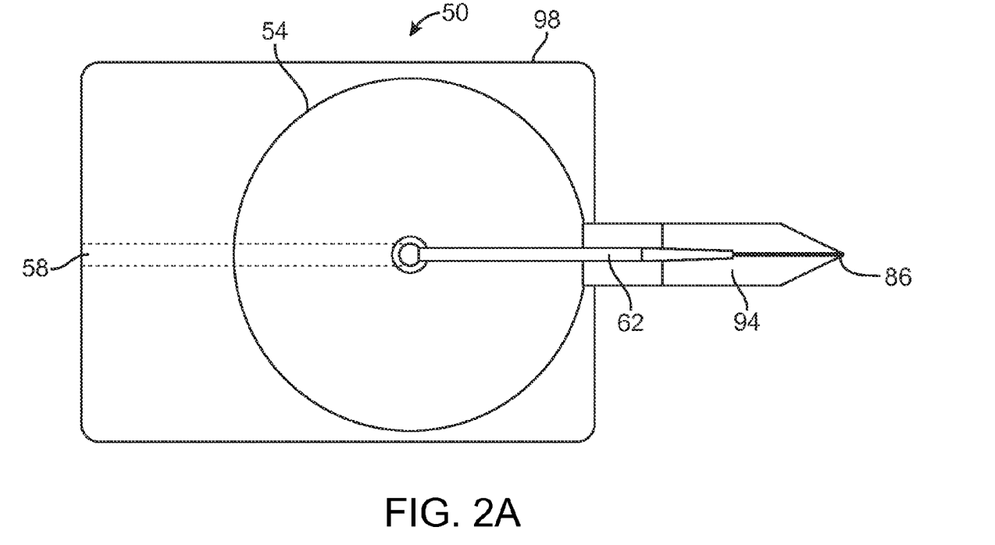
FIG. 2A is a bottom view of a first embodiment of a surface sampling probe having a slotted liquid extraction channel.
Figure 2B:
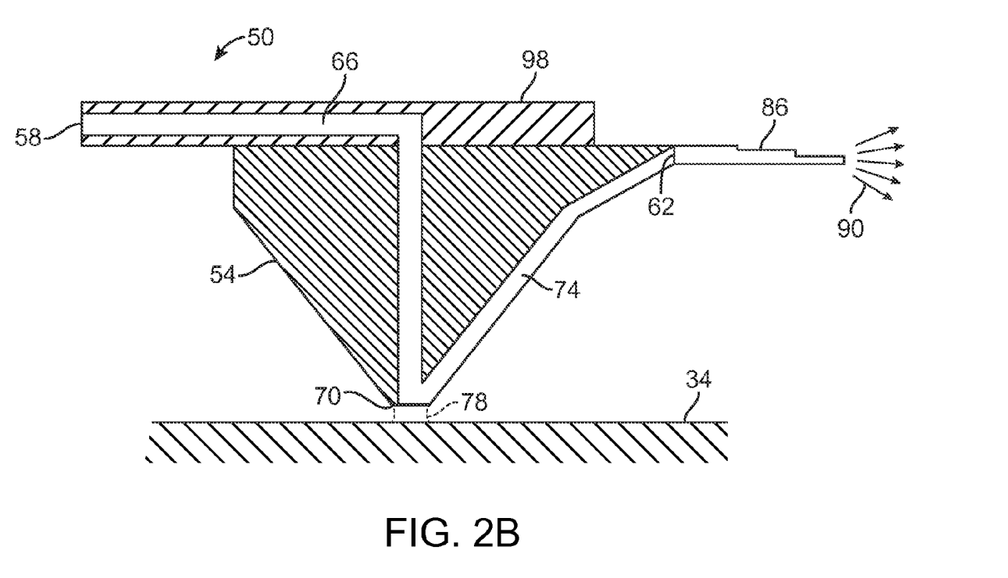
FIG. 2B is a cross-section.

There is shown in FIG. 2 a liquid extraction surface sampling probe 50. The probe 50 has a probe body 54, a liquid inlet 58, and a liquid outlet 62. A solvent delivery conduit 66 receives solvent liquid from the liquid inlet 58 and delivers the solvent liquid to a liquid extraction tip 70. An open liquid extraction channel 74 extends across an exterior surface of the probe body 54 from the liquid extraction tip 70 to the liquid outlet 62. In one embodiment, solvent leaving the liquid extraction tip 70 forms a liquid microjunction 78 with the sample surface 34. Sample-containing solvent is extracted from the liquid extraction tip 70 into the liquid extraction channel 74 by capillary action and is wicked to the liquid outlet 62. The probe body 54 can be mounted to a suitable structure such as arm 98, which in one embodiment can be the cantilever of an atomic force microscope.

An electrospray emitter tip 86 can be provided. The electrospray emitter tip 86 can be of any suitable design. The electrospray emitter tip receives the sample-containing solvent from the liquid outlet 62 and forms an electrospray 90 that is suitable for analysis. The electrospray emitter tip 86 can be provided on a nib 94 that is secured to the probe body 54 by any suitable means.

Figure 3A:
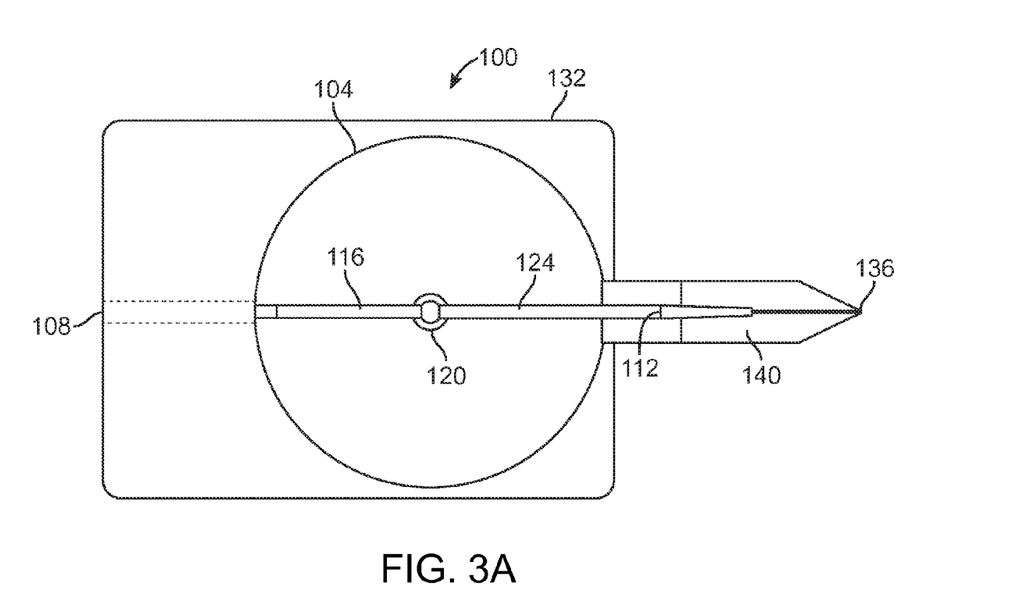
FIG. 3A is a bottom view of an alternative embodiment having a slotted solvent delivery conduit.
Figure 3B:
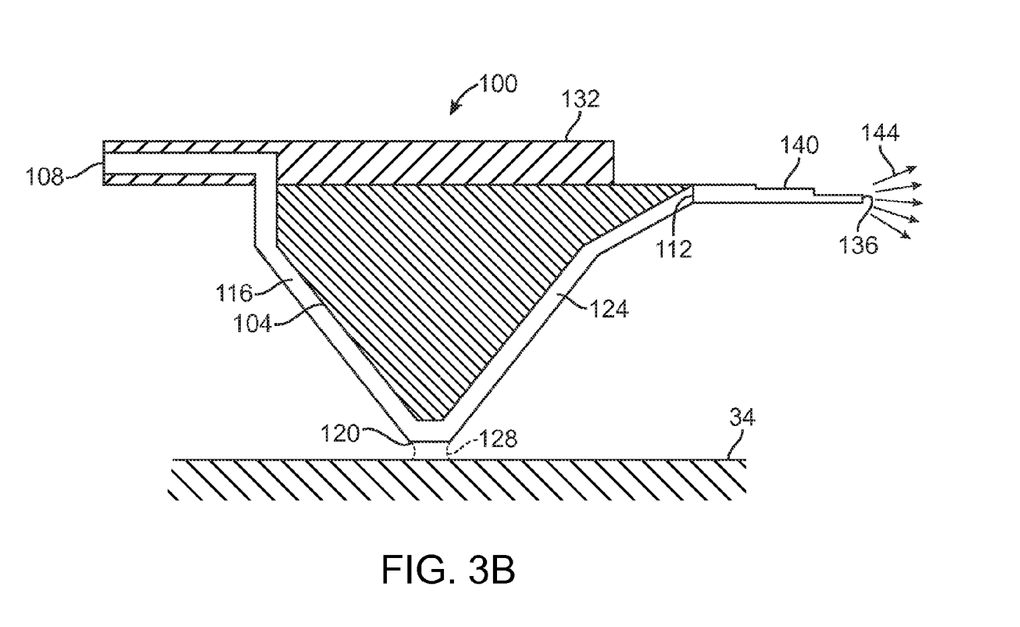
FIG. 3B is a cross-section.

There is shown in FIG. 3 a liquid extraction surface sampling probe 100. The probe 100 has a probe body 104, a liquid inlet 108, and a liquid outlet 112. A solvent delivery conduit 116 is provided in the form of a open slotted channel extending across the surface of probe body 104. The slotted solvent delivery conduit 116 delivers the solvent liquid to a liquid extraction tip 120. An open liquid extraction channel 124 extends across an exterior surface of the probe body 104 from the liquid extraction tip 120 to the liquid outlet 112. In one embodiment, solvent leaving the liquid extraction tip 120 forms a liquid microjunction 128 with the sample surface 34. Sample-containing solvent is extracted from the liquid extraction tip 120 into the extraction channel 124 by capillary action and is wicked to the liquid outlet 112. The probe body 104 can be mounted to suitable structure such as arm 132 which in one embodiment can be the cantilever of an atomic force microscope.

An electrospray emitter tip 136 can be provided on a nib 140 that is secured to the probe body 104 by any suitable means. The electrospray emitter tip 136 receives the sample-containing solvent from the liquid outlet 112 and forms an electrospray 144 that is suitable for analysis.

Figure 4A:
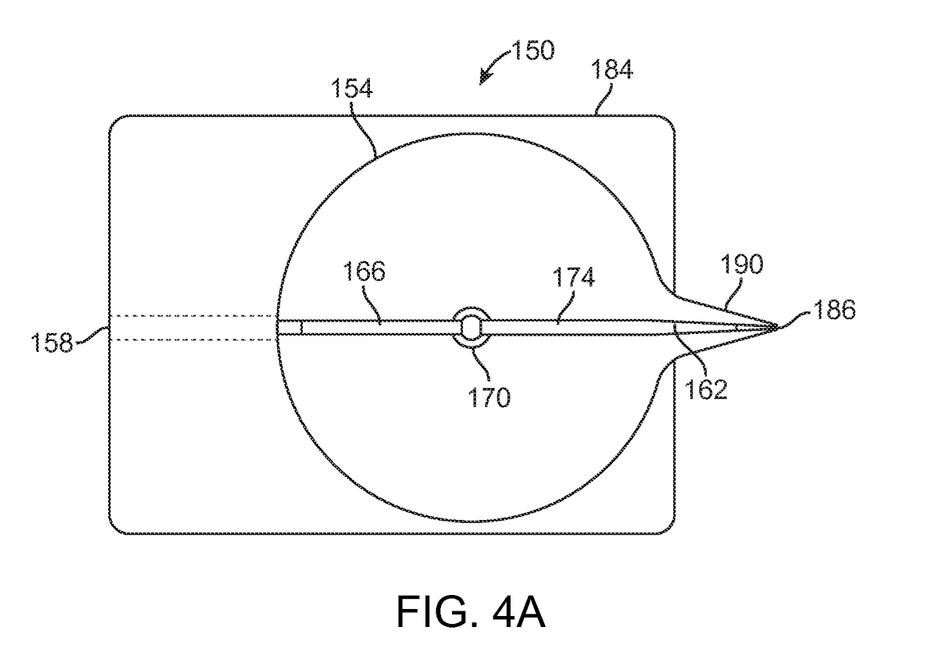
FIG. 4A is a bottom view of an embodiment having an integral electrospray emitter tip.
Figure 4B:
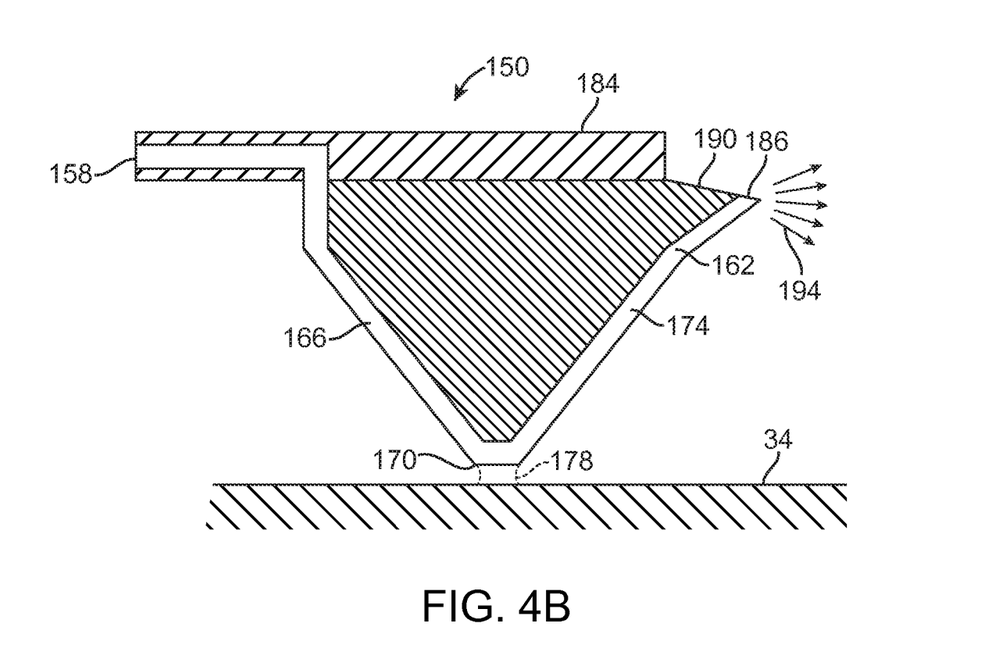
FIG. 4B is a cross-section.

There is shown in FIG. 4 a liquid extraction surface sampling probe 150. The probe 150 has a probe body 154, a liquid inlet 158, and a liquid outlet 162. A solvent delivery conduit 166 is provided in the form of an open slotted channel extending across the surface of probe body 154. The slotted solvent delivery conduit 166 delivers the solvent liquid to a liquid extraction tip 170. An open liquid extraction channel 174 extends across an exterior surface of the probe body 154 from the liquid extraction tip 170 to the liquid outlet 162. In one embodiment, solvent leaving the tip 170 forms a liquid microjunction 178 with the sample surface 34. Sample-containing solvent is extracted from the liquid extraction tip 170 into the extraction channel 174 by capillary action and is wicked to the liquid outlet 162. The probe body 154 can be mounted to suitable structure such as arm 184 which in one embodiment can be the cantilever of an atomic force microscope.

An electrospray emitter tip 186 can be provided on a protrusion 190. The electrospray emitter tip 186 receives the sample-containing solvent from the liquid outlet 162 and forms an electrospray 194 that is suitable for analysis.

Figure 5A:
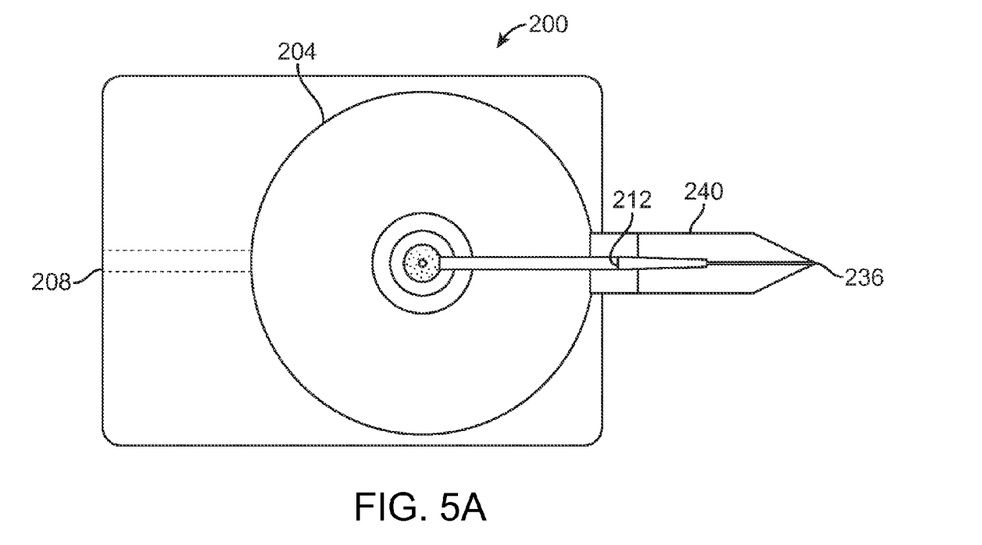
FIG. 5A is a bottom view of an embodiment having a conical solvent delivery conduit.
Figure 5B:
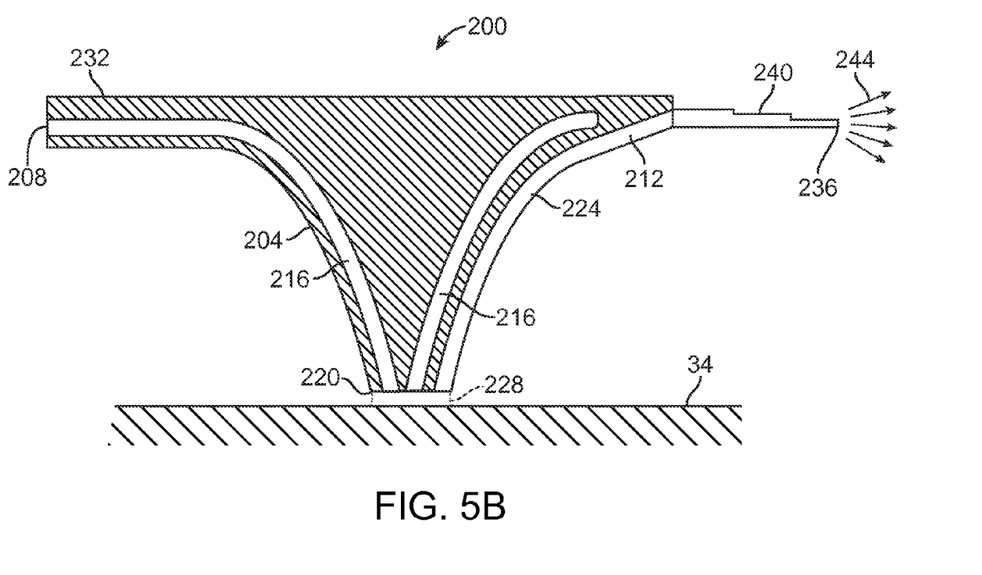
FIG. 5B is a cross-section.

There is shown in FIG. 5 a liquid extraction surface sampling probe 200. The probe 200 has a probe body 204, a liquid inlet 208, and a liquid outlet to 212. A solvent delivery conduit 216 receives solvent liquid from the liquid inlet 208 and delivers the solvent liquid to a liquid extraction tip 220. The solvent delivery conduit 216 is in the form of a conical annulus, such that solvent will be funneled down to the tip 220. An open liquid extraction channel 224 extends across an exterior surface of the probe body 204 from the liquid extraction tip 220 to the liquid outlet 212. In one embodiment, solvent leaving the liquid extraction tip 220 forms a liquid microjunction 228 with the sample surface 34. Sample-containing solvent is extracted from the liquid extraction tip 220 into the extraction channel 224 by capillary action and is wicked to the liquid outlet 212. The probe body 204 can be mounted to a suitable structure such as arm 232 which in one embodiment can be the cantilever of an atomic force microscope.

An electrospray emitter tip 236 can be provided on a nib 240 that is secured to the probe body 204 by any suitable means. The electrospray emitter tip 236 receives the sample-containing solvent from the liquid outlet 212 and forms an electrospray 244 that is suitable for analysis.

Figure 6A:
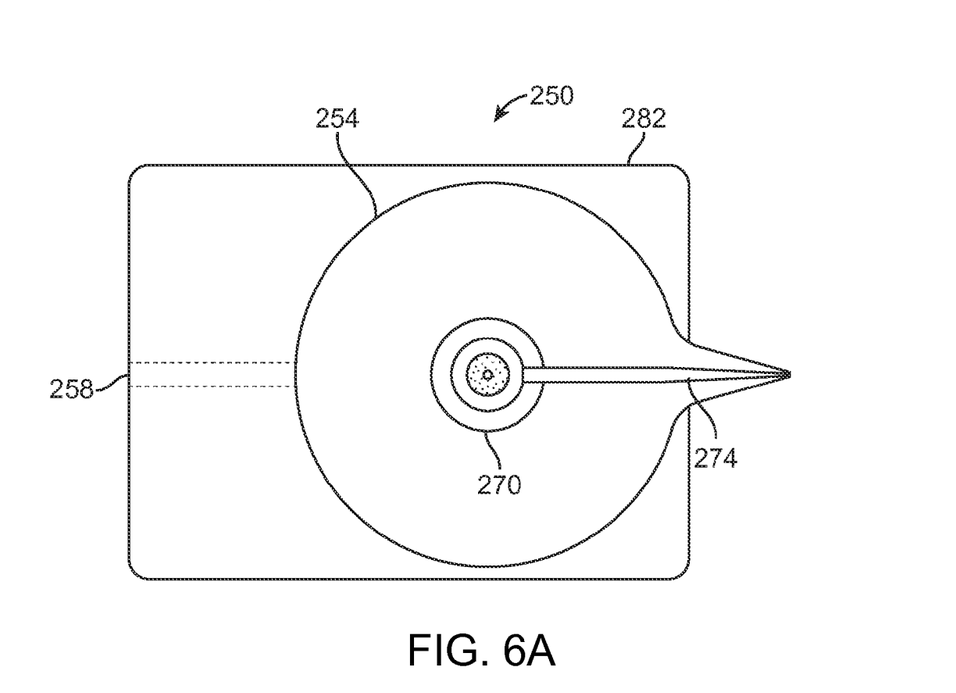
FIG. 6A is a bottom view of an embodiment having a conical solvent delivery conduit and an integral electrospray emitter tip.
Figure 6B:
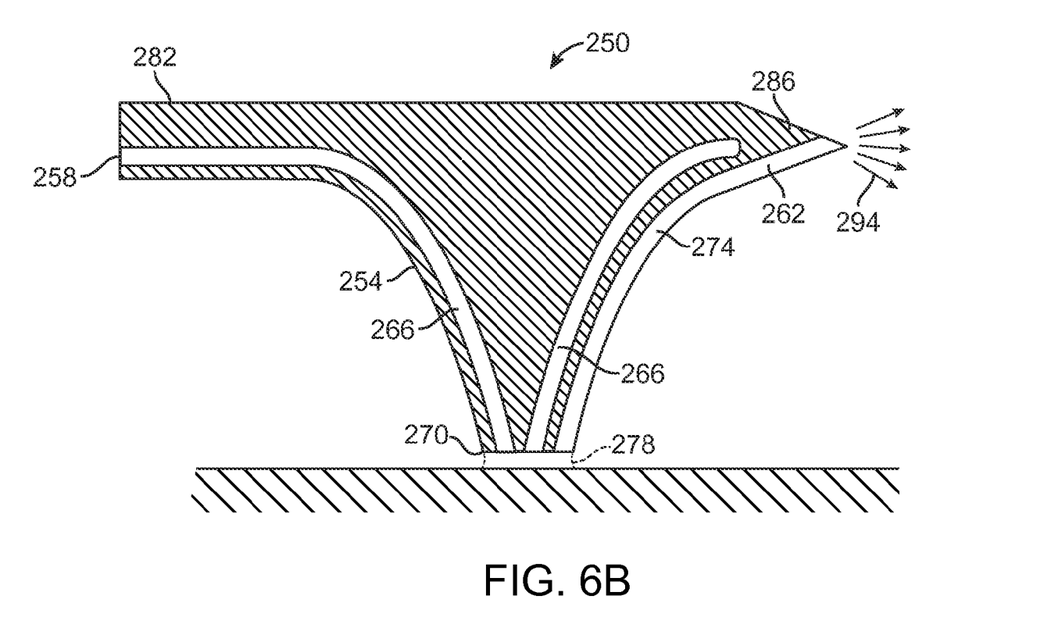
FIG. 6B is a cross-section.

There is shown in FIG. 6 a liquid extraction surface sampling probe 250. The probe 250 has a probe body 254, a liquid inlet 258, and a liquid outlet to 262. A solvent delivery conduit 266 receives solvent liquid from the liquid inlet 258 and delivers the solvent liquid to a liquid extraction tip 270. The solvent delivery conduit 266 is in the form of a conical annulus, such that solvent will be funneled down to the tip 270. An open liquid extraction channel 274 extends across an exterior surface of the probe body 254 from the liquid extraction tip 220 to the liquid outlet 212. In one embodiment, solvent leaving the liquid extraction tip 220 forms a liquid microjunction 278 with the sample surface 34. Sample-containing solvent is extracted from the tip 220 into the extraction channel 274 by capillary action and is wicked to the liquid outlet 262. The probe body 254 can be mounted to a suitable structure such as arm 282 which in one embodiment can be the cantilever of an atomic force microscope.

An electrospray emitter tip 286 can be provided on a protrusion 290 that can be formed with the probe body 254 by any suitable means such as molding, milling or 3D printing. The electrospray emitter tip 286 receives the sample-containing solvent from the liquid outlet 262 and forms an electrospray 294 that is suitable for analysis.

Figure 7:
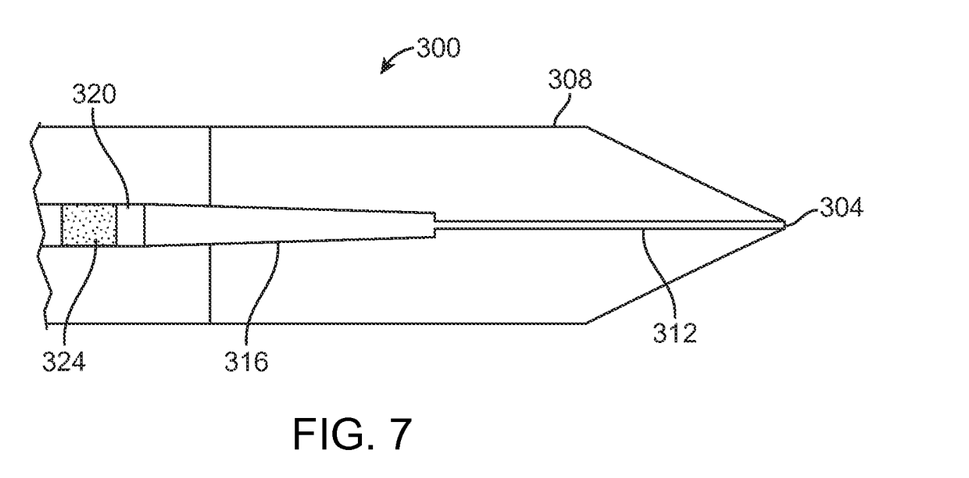
FIG. 7 is a magnified view of an electrospray nib having an electrospray emitter tip.
Figure 8:
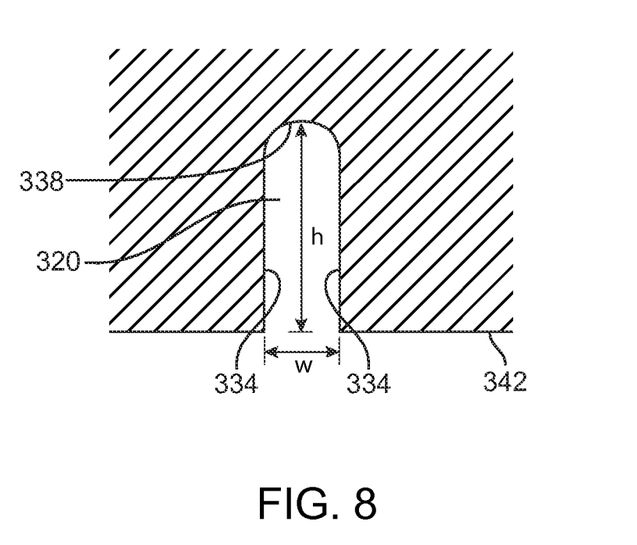
FIG. 8 is a cross-section of a liquid extraction channel.
Figure 9:
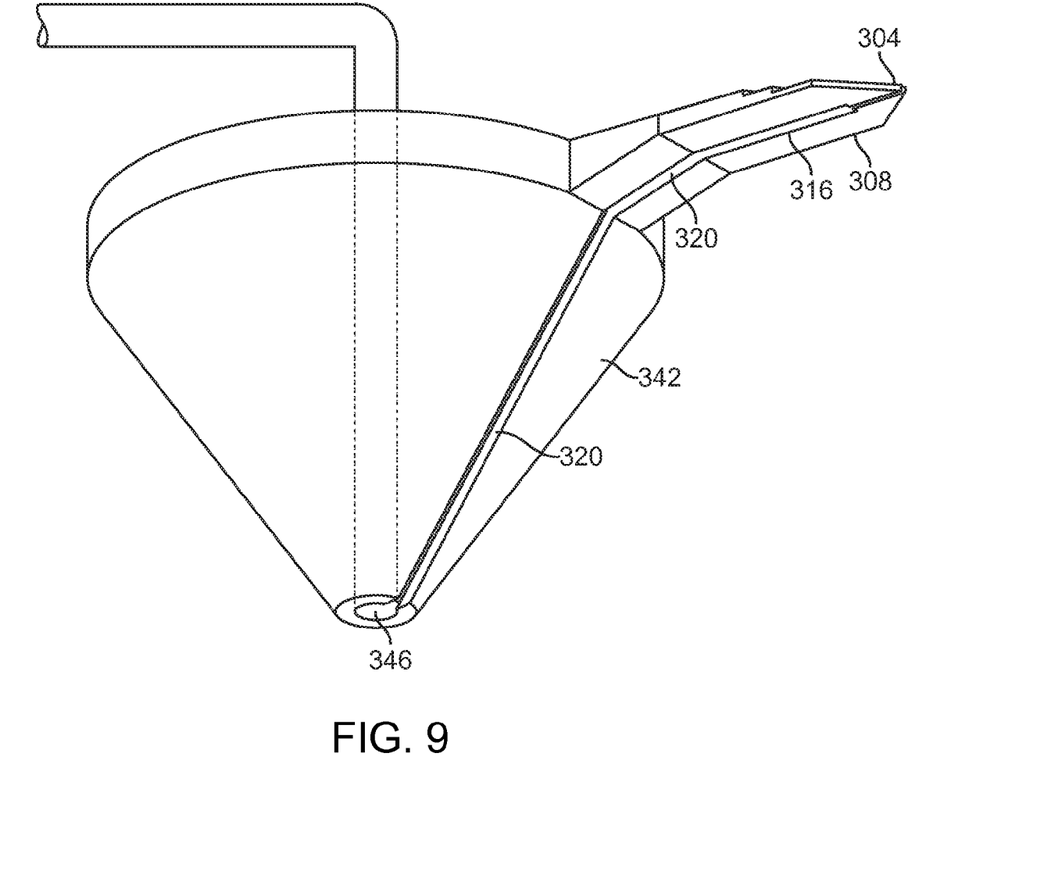
FIG. 9 is a perspective view, partially in phantom, of a liquid extraction surface sampling probe having a slotted liquid extraction channel.

There is shown in FIGS. 7-9 an electrospray emitter nib 300 having an electrospray emitter tip 304 that is formed at the distal end of a nib body 308. An electrospray emitter channel 312 carries sample-containing solvent to the electrospray emitter tip 304 where it is released from the electrospray emitter tip 304 as an electrospray for suitable analysis in a suitable analysis device. An electrospray nib channel 316 carries the sample-containing solvent from a liquid extraction channel 320 of the probe to the electrospray emitter channel 312.

A suitable electrical contact 324 can be provided to create a voltage gradient between the electrospray emitter tip 304 and a counter-electrode so as to create an electric field appropriate to initiate the electrospray process. The voltage can be applied near or at the electrospray emitter tip or elsewhere in the probe or in the solvent source or solvent delivery conduit or at the counter-electrode. It is only necessary that the solvent be at the required voltage at the time that it is released from the electrospray emitter tip 304. To electrospray a water solution requires an electric field at the spray tip of about $1.8 \times 10^8$ V/m. Solvents like methanol with a lower surface tension require less voltage.

The liquid extraction channel is open to the surrounding atmosphere such that there is a reduced opportunity for clogging by sample particulates. Flow to the liquid extraction tip of the probe body can be gravitational or can be promoted by a suitable pump or pressurized source of solvent. Upon reaching the liquid extraction tip, the solvent is placed in contact with the sample surface and is at the surrounding atmospheric pressure. Flow into and through the liquid extraction channel can be by or assisted by capillary action. Capillary action is promoted where the dimensions of each succeeding flow channel are reduced from the prior channel. Thus the dimensions of the liquid extraction channel are less than the dimensions at the liquid extraction tip 346. As can be seen in FIG. 7, the dimensions of the electrospray nib channel 316 are reduced from the dimensions of the liquid extraction channel 320. The dimensions of the electrospray emitter channel 312 are reduced from the dimensions of the electrospray nib channel 316. The dimensions of a channel can taper in the direction of flow as shown for the electrospray nib channel 316 to promote capillary flow or wicking of the sample-containing solvent to the electrospray emitter tip 304. The liquid extraction channel can have a width that is less than or equal to the width of the solvent orifice of the liquid extraction tip. The channels in one aspect are between 10-1000 nm or between 100-500 nm in width. The solvent flow rate can be less than 1000 nanoliters/min or between 0.1-500 nanoliters/min. Other flow rates are possible.

Flow through the liquid extraction channel will also be facilitated be the formation of the electrospray at the electrospray emitter tip. The charged electrospray will be pulled away from the electrospray emitter tip, drawing the liquid toward the electrospray emitter tip. This action of the electric field at the electrospray emitter tip will act to draw more sample-containing solvent through the liquid extraction channel.

The dimensions of the channels to foster capillary flow can vary. In one aspect, the width of the succeeding channels is reduced relative to prior channels, such that the electrospray nib channel 316 has a reduced width relative to the liquid extraction channel 320. As shown in FIG. 8, the liquid extraction channel 320 can be formed by side walls 334 and base wall 338 as formed in the surface of probe body 342. The aspect ratio of the liquid extraction channel 320 is the ratio of the height h to the width w. The aspect ratio should be greater than 1 to facilitate capillary flow. Similarly, the aspect ratio of succeeding flow channels can be greater than the aspect ratio of prior channels to facilitate capillary flow from channel to channel.

Figure 10:
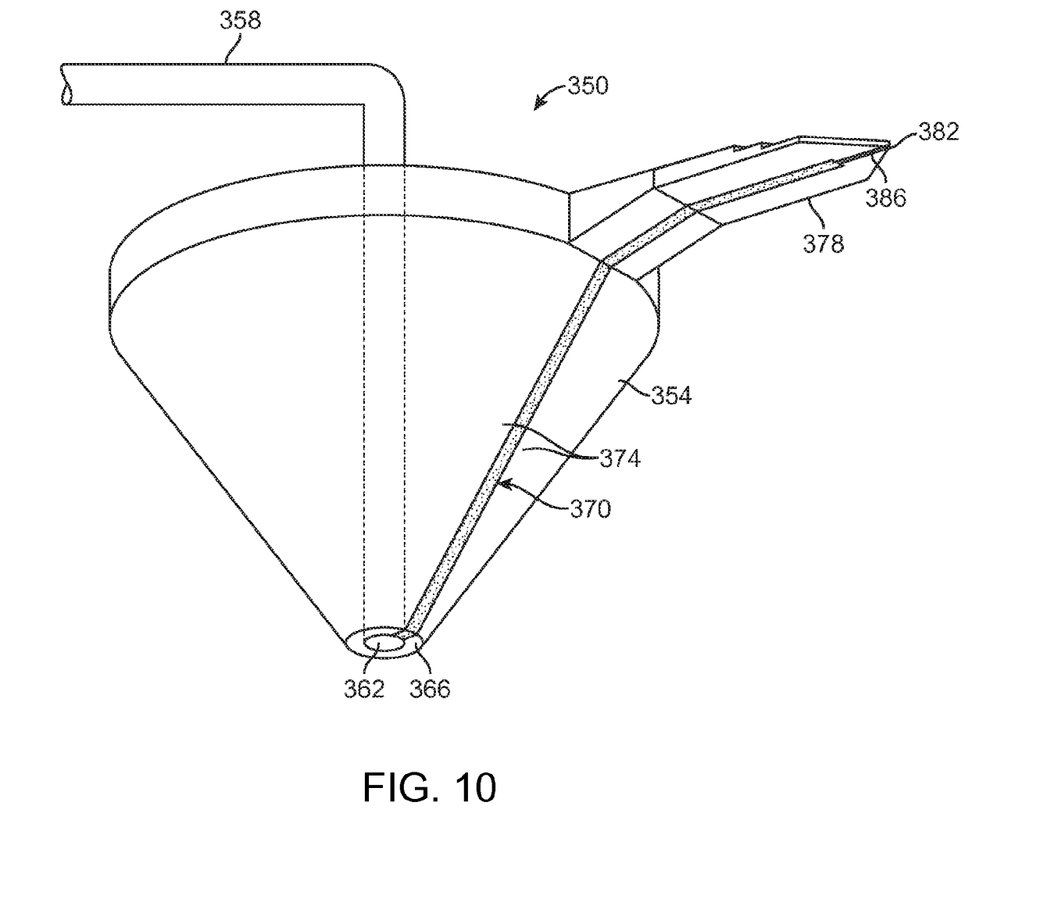
FIG. 10 is a perspective view, partially in phantom, of a liquid extraction surface sampling probe having an alternative liquid extraction channel.

The liquid extraction channel can be constructed in any suitable manner that is open to the atmosphere surrounding the probe body. There is shown in FIG. 10 a liquid extraction surface sampling probe 350 having a probe body 354. Solvent is received through a suitable solvent delivery conduit 358 and passes through an orifice 362 of liquid extraction tip 366 to contact the sample. Sample-containing solvent is drawn up the side of the probe body 354 by means of an open liquid extraction flow channel 370 in the form of a strip of hydrophilic material. The hydrophilic material forming the liquid extraction channel 370 can the any suitable hydrophilic material, such as a material providing a contact angle with the solvent of less than 90 degrees. The hydrophilic character of the channel 370 should be greater than that of surrounding areas 374 of the probe body 354. The surrounding areas 374 in this embodiment should thus be more hydrophobic than the material making up the liquid extraction channel 370. In this manner, the solvent will be wicked up the liquid extraction channel 370 to the electrospray emitter nib 378 and electrospray emitter tip 382. An electrospray emitter channel 386 or other suitable flow path can receive the sample-containing solvent from the liquid extraction channel 370 and deliver the solvent to the electrospray emitter tip 382.

Figure 11A:
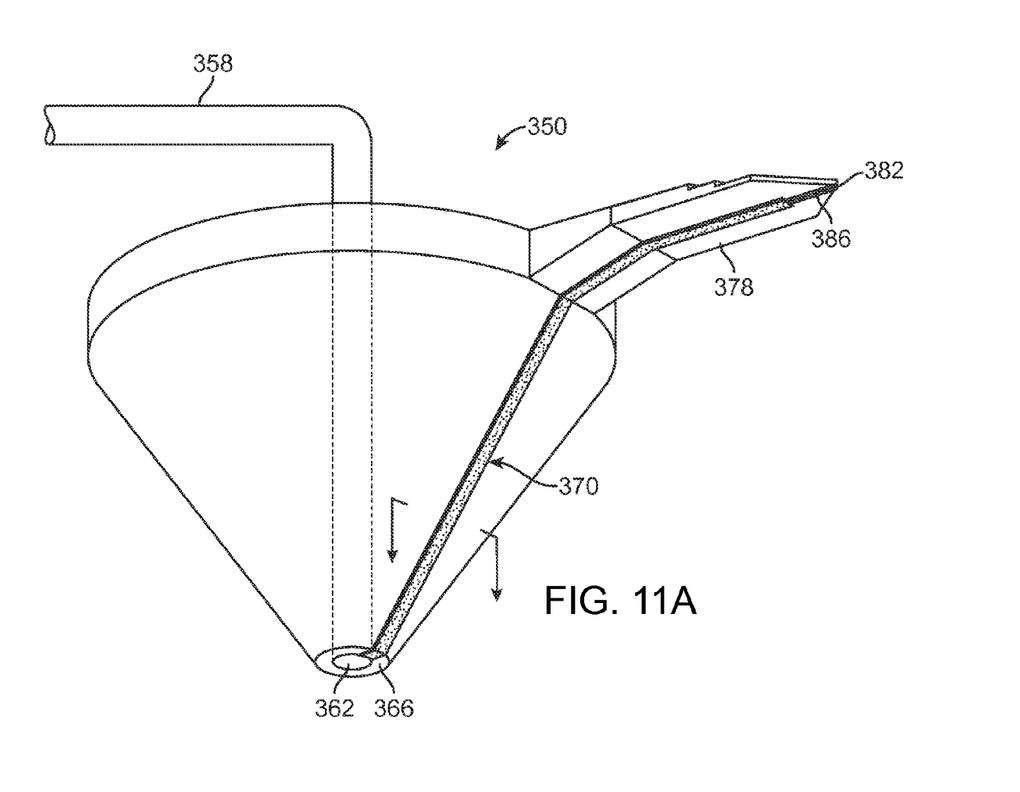
FIG. 11A is a perspective view, partially in phantom, of a liquid extraction surface sampling probe having a surface-applied liquid extraction channel.
Figure 11B:
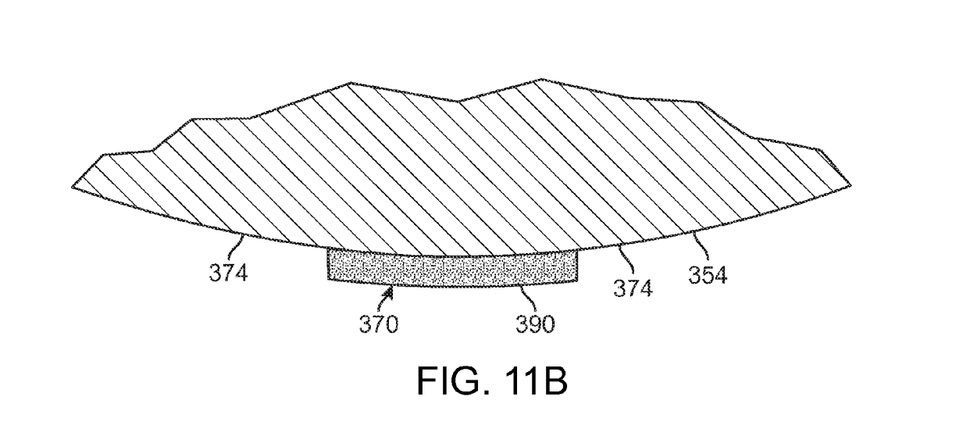
FIG. 11B is a cross section illustrating the surface application.
Figure 12A:
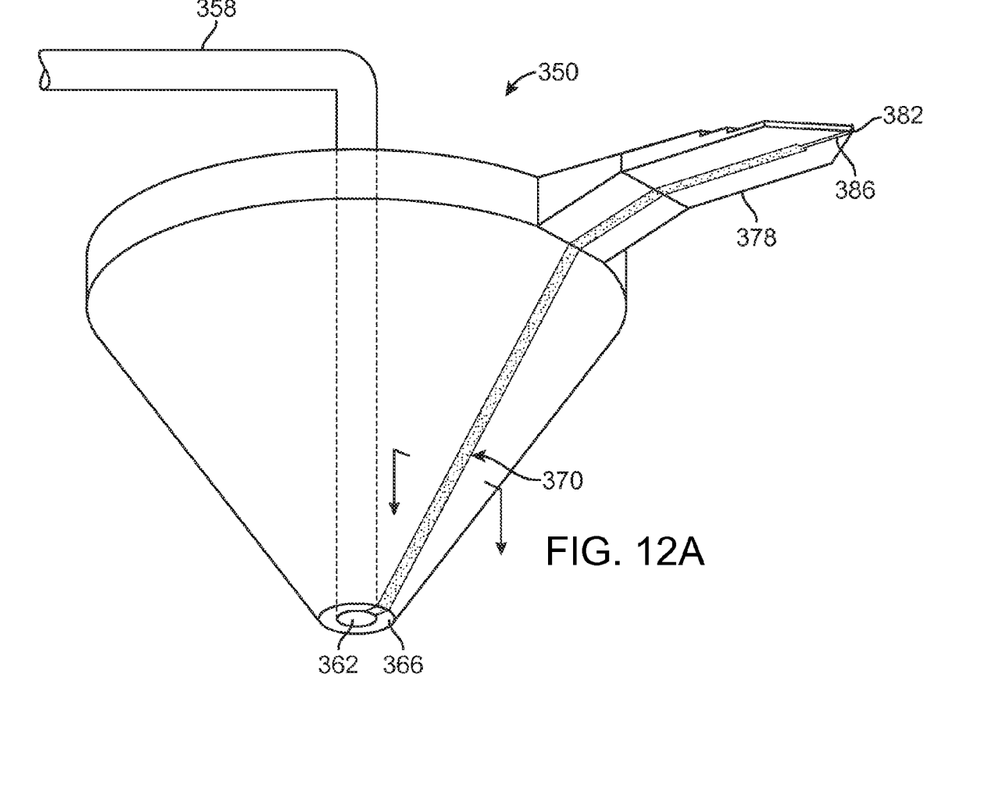
FIG. 12A is a perspective view, partially in phantom, of a liquid extraction surface sampling probe having a surface-modified liquid extraction channel.
Figure 12B:
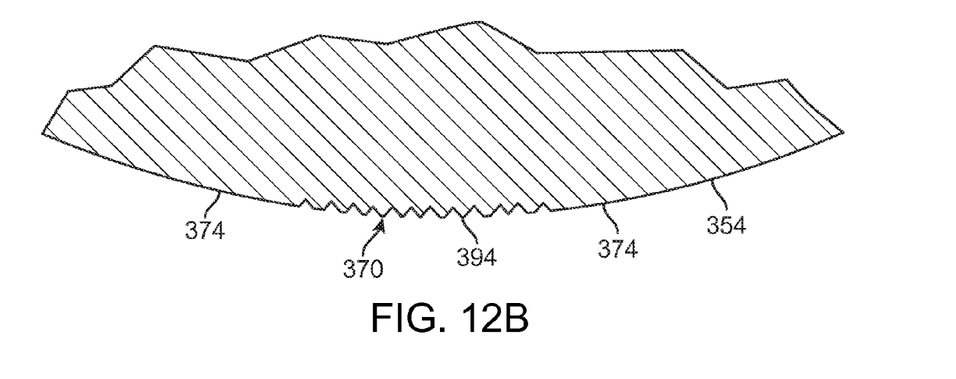
FIG. 12B is a cross-section illustrating the surface modifications.

The manner in which the liquid extraction channel can be rendered more hydrophilic than surrounding areas of the probe body can be varied. There is shown in FIG. 11 an embodiment in which the liquid extraction channel 370 is formed by a strip 390 of material that is applied to the probe body 354 and is more hydrophilic than surrounding areas 374 of its the probe body 354. The strip 390 can comprise a surface providing a contact angle with the solvent of 90 degrees or less. There is shown in FIG. 12 an embodiment in which the liquid extraction channel 370 is formed by surface modifying the probe body 354 as with nano-structure or etching 394 such that the liquid extraction channel 370 is more hydrophilic than surrounding areas 374 of the probe body 354. The surface modification can provide a contact angle with the solvent of 90 degrees or less. It is alternatively possible to treat surrounding areas to be more hydrophobic that the liquid extraction channel, such that the aqueous solvent will be drawn through the liquid extraction channel.

The invention provides AFM devices capable of both dispensing and aspirating as necessary for a subsequent analysis of the extracted sample. The use of very low micrometer or smaller diameter capillaries to deliver and, especially, to retrieve and transport the extract at nanoliter/min flow rates is possible. In a continuous sampling mode a liquid junction is created with the sample surface and the electrospray process is continuous. In a tapping mode the liquid junction with the surface is broken and the electrospray process is initiated. In an alternative tapping mode, the liquid junction is created and broken repeatedly as the probe tip is moved to and from the surface and the electrospray is continuous. Alternating the sampling/spray and tapping modes of operation may allow analysis of wettable or absorbant surfaces. The AFM hardware and software also can provide built-in probe to surface liquid junction control. Also, the AFM capability provides automatic co-registration of spatial information from the multiple measurements of the surface within the same system. The AFM probe of the invention when used in conjunction with appropriate AFM hardware and software can be used for measurements such as topography, conductivity and current imaging among others. These measurements may be performed simultaneously with operation of the liquid extraction system, or separately.

This invention can be embodied in other forms without departing from the spirit or essential attributes thereof. Accordingly reference should be made to the following claims to determine the scope of the invention.

I claim:

1. An electrospray system, comprising:
  a liquid extraction surface sampling probe, comprising a probe body having a liquid inlet and a liquid outlet, and having a liquid extraction tip, a solvent delivery conduit for receiving solvent liquid from the liquid inlet and delivering the solvent liquid to the liquid extraction tip, and an open liquid extraction channel extending across an exterior surface of the probe body from the liquid extraction tip to the liquid outlet; and,
  an electrospray emitter tip in liquid communication with the liquid outlet of the liquid extraction surface sampling probe.

2. The electrospray system of claim 1, wherein the liquid extraction channel is a slotted channel extending across an exterior surface of the probe body from the liquid extraction tip to the liquid outlet.

3. The electrospray system of claim 2, wherein the aspect ratio of the slotted liquid extraction channel is greater than 1.

4. The electrospray system of claim 1, wherein the electrospray emitter tip is affixed to the probe body.

5. The electrospray system of claim 1, wherein the electrospray emitter tip is integral with the probe body.

6. The electrospray system of claim 1, wherein the solvent delivery conduit is a slotted channel extending across an exterior surface of the probe body from the liquid inlet to the liquid extraction tip.

7. The electrospray system of claim 6, wherein the aspect ratio of the slotted channel is greater than 1.

8. The electrospray system of claim 1, wherein the electrospray emitter tip is provided on an electrospray nib, the electrospray nib having a liquid nib channel for receiving extraction liquid from the liquid extraction channel and the liquid outlet, and delivering the extraction liquid to the electrospray emitter tip.

9. The electrospray system of claim 8, wherein the electrospray nib comprises a protrusion from the probe body, the protrusion shaped to provide the electrospray emitter tip, the electrospray nib having a nib channel extending from the liquid outlet to the electrospray emitter tip.

10. The electrospray system of claim 8, wherein the nib channel is an open slot.

11. The electrospray system of claim 10, wherein the nib channel has an aspect ratio greater than 1.

12. The electrospray system of claim 1, wherein the solvent delivery conduit is enclosed and passes through the probe body.

13. The electrospray system of claim 1, wherein the solvent delivery conduit is an annular, inverted conical chamber within the probe body, the inverted conical chamber communicating with the liquid extraction tip at an apex end of the cone, and with the liquid inlet at a base end of the cone.

14. The electrospray system of claim 1, wherein the probe is configured as part of an atomic force microscope cantilever.

15. The electrospray system of claim 1, wherein the surface of the liquid extraction channel comprises a material that has a contact angle that is less that the contact angle of probe body surfaces adjacent to the liquid extraction channel.

16. The electrospray system of claim 15, wherein the contact angle of the material making up the liquid extraction channel is less than 90 degrees.

17. The electrospray system of claim 15, wherein the liquid extraction channel is slotted.

18. The electrospray system of claim 15, wherein the liquid extraction channel is surface-treated to provide a contact angle of 90 degrees or less.

19. The electrospray system of claim 15, wherein the liquid extraction channel is coated with a material having a contact angle of 90 degrees or less.

20. The electrospray system of claim 1, wherein the liquid extraction tip comprises an orifice for forming a liquid microjunction of solvent between the liquid extraction tip and a sample surface.

21. A system for analyzing samples, comprising:
a liquid extraction surface sampling probe, comprising a probe body having a liquid inlet and a liquid outlet, and having a liquid extraction tip, a solvent delivery conduit for receiving solvent liquid from the liquid inlet and delivering the solvent liquid to the liquid extraction tip, and an open liquid extraction channel extending across an exterior surface of the probe body from the liquid extraction tip to the liquid outlet; and an electrospray emitter tip in liquid communication with the liquid outlet of the liquid extraction surface sampling probe; and,
an analysis device for receiving the electrospray and analyzing the sample.

22. The system for analyzing samples of claim 21, wherein the analysis device is at least one selected from the group consisting of a mass spectrometer, an ion mobility spectrometer, and a differential mobility analyzer.

23. The system for analyzing samples of claim 21, wherein the probe is configured as part of an atomic force microscope cantilever, and the cantilever is connected to an atomic force microscope.

24. A liquid junction surface sampling system, comprising:
a liquid extraction surface sampling probe, comprising a probe body having a liquid inlet and a liquid outlet, and having a liquid extraction tip, a solvent delivery conduit for receiving solvent liquid from the liquid inlet and delivering the solvent liquid to the liquid extraction tip, and an open liquid extraction channel extending across an exterior surface of the probe body from the liquid extraction tip to the liquid outlet, the probe being configured as part of an atomic force microscope cantilever, and the cantilever is connected to an atomic force microscope.

25. The liquid junction surface sampling system of claim 24, wherein the probe further comprises an electrospray emitter tip in liquid communication with the liquid outlet of the liquid extraction surface sampling probe, and the system further comprises an analysis device for receiving the electrospray and analyzing the sample.

26. The liquid junction surface sampling system of claim 25, wherein the analysis device is at least one selected from the group consisting of a mass spectrometer, an ion mobility spectrometer, and a differential mobility analyzer.

27. A method of analyzing samples, comprising the steps of:
providing a liquid extraction surface sampling probe, comprising a probe body having a liquid inlet and a liquid outlet, and having a liquid extraction tip, a solvent delivery conduit for receiving solvent liquid from the liquid inlet and delivering the solvent liquid to the liquid extraction tip, and an open liquid extraction channel extending across an exterior surface of the probe body from the liquid extraction tip to the liquid outlet; and an electrospray emitter tip in liquid communication with the liquid outlet of the liquid extraction surface sampling probe;
applying solvent liquid to a sample surface through the solvent delivery conduit and the liquid extraction tip of the liquid extraction surface sampling probe;
removing sample-containing solvent through the liquid extraction channel;
directing the sample-containing solvent through the electrospray tip, the electrospray tip forming an electrospray from the sample-containing solvent; and,
directing the electrospray to an analysis device.

28. The method of claim 27, further comprising the step of using the liquid extraction surface sampling probe as an atomic force microscope tip, and taking atomic force microscope readings with the tip.

* * * * *